United States Patent

Secrist et al.

[15] 3,639,701

[45] Feb. 1, 1972

[54] MAGNETIC RECORDING HEAD HAVING A NONMAGNETIC FERRITE GAP

[72] Inventors: Duane R. Secrist; Harold L. Turk, both of San Jose; Calif.

[73] Assignee: International Business Machines Corporation, Armonk, N.Y.

[22] Filed: July 2, 1970

[21] Appl. No.: 51,928

[52] U.S. Cl. ....................179/100.2 C, 29/603, 340/174.1 F

[51] Int. Cl. ....................G11b 5/14, G11b 5/42

[58] Field of Search ....................179/100.2 C; 340/174.1 F; 346/74 MC; 29/603

[56] References Cited

UNITED STATES PATENTS

| | | | |
|---|---|---|---|
| 3,495,045 | 2/1970 | Varadi et al. | 179/100.2 C |
| 3,529,349 | 9/1970 | Vande Schoot et al. | 179/100.2 C |
| 3,478,340 | 11/1969 | Schwartz et al. | 179/100.2 C |
| 3,479,738 | 11/1969 | Hanak | 179/100.2 C |
| 3,495,325 | 2/1970 | Bos et al. | 179/100.2 C |

OTHER PUBLICATIONS

Magnetic Mat' ls in Elect. Indust.- Bardell, P. R. 1960 & co., London p. 227- 231 (TK 453 B3 1960)

*Primary Examiner*—Bernard Konick
*Assistant Examiner*—Jay P. Lucas
*Attorney*—Hanifin and Jancin and Robert W. Keller

[57] ABSTRACT

A magnetic head assembly is claimed. The magnetic head assembly comprises a pair of magnetic ferrites having mating surfaces and a transducing gap comprising a nonmagnetic crystalline ceramic, which may particularly be a nonmagnetic ferrite, formed as a bond between the mating surfaces. More particularly, the bond is formed by solid-state diffusion.

12 Claims, 3 Drawing Figures

INVENTORS.
DUANE R. SECRIST
HAROLD L. TURK

BY Robert W. Keller
ATTORNEY

MAGNETIC RECORDING HEAD HAVING A NONMAGNETIC FERRITE GAP

BACKGROUND OF THE INVENTION

1. Field of the Invention

This invention relates to a magnetic head assembly having a nonmagnetic crystalline ceramic formed as a bond between mating surfaces of a pair of magnetic ferrites, and more particularly, to an assembly wherein the bond is formed by solid-state diffusion.

2. Description of Prior Art

Magnetic heads for recording and/or reproducing apparatus, computer apparatus, etc., normally consists of at least two circuit parts made of a magnetic material, as for example, sintered ferromagnetic oxide, between which is provided an effective gap, and a coil disposed about one of the circuit parts. The gap can be an airgap, or can be filled in which a nonmagnetic material, such as glass. The gap provides a high reluctance area with the magnetic coating on a magnetic disk or tape serving as a low-reluctance path fro the magnetic flux in the head. As the number of tracks on the recording media is increased, and the relative speed between the head and the recording media are increased, the greater becomes the need for better resolution of the recording and pickup magnetic performance of the head. In addition, to decrease the gap region of high reluctance a very thin recording gap must be developed which is defect-free and which presents no adhesion problems between the materials comprising the gap and the magnetic pole tip, However, when the length of the gap is decreased to a very thin dimension, as is necessary to meet the desired objective in modern technology, the practical production and assembly techniques for obtaining the narrow width gap to the accuracy desired become increasingly more difficult.

One known method is to machine two magnetic ferrite sections, whereby the mating surfaces are polished. These surfaces are then coated with silicon monoxide shims by evaporation to define the recording head gap length. This length is later filled with glass by capillary soaking and the module formed by the above-listed method is sliced into many recording head elements. However, this method presents difficulties in that it does not assure accuracy of the gap width; requires that the gap length be inspected prior to the glass filling operation; and requires two glasses, one glass for filling the gap between the mating pole tip surfaces and a second glass for subsequent potting and bonding operations. The aforementioned difficulties in the known methods of forming accurate gap lengths in magnetic heads is particularly meaningful when it is realized that the gap width desired in modern heads is on the order of 100 microinches or less.

SUMMARY OF THE INVENTION

It is an object of this invention to provide a magnetic head assembly which comprises a pair of magnetic ferrites having mating surfaces, and a nonmagnetic crystalline ceramic formed as a bond between the mating surfaces.

It is still another object to provide a magnetic head assembly of the type set forth, wherein the bonding substance is a nonmagnetic ferrite.

In accordance with the above-listed object, it is still another object to create a bond wherein the nonmagnetic ferrite is continuous between the mating surfaces of the magnetic ferrite.

In accordance with the preceding objects, it is still another object to provide a nonmagnetic ceramic bond having substantially the same hardness as the magnetic ferrite and wherein the constituents of the magnetic and nonmagnetic ferrites have substantially the same diffusion coefficients.

It is still another object to provide a nonmagnetic ferrite which contains an element from the group comprising manganese, cobalt, nickel and magnesium.

It is still another object to provide a nonmagnetic ferrite which contains either zinc or cadmium.

In accordance with the preceding objects, another object is to provide a magnetic head assembly wherein the bond between the nonmagnetic ceramic and the magnetic ferrite is formed by solid-state diffusion.

It is another object to provide a magnetic head assembly as set forth above, wherein the solid state diffusion occurs upon heating to a temperature above 950° C. to enhance the rate of diffusion.

Further features of the invention pertain to the particular composition of the parts of the magnetic head assembly, whereby the above-outlined and additional operating features thereof are attained.

The invention, both as to its organization and method of operation, together with further objects and advantages thereof, will best be understood by reference to the following specification taken in connection with the accompanying drawings.

DESCRIPTION OF PREFERRED EMBODIMENT

Figure 1:
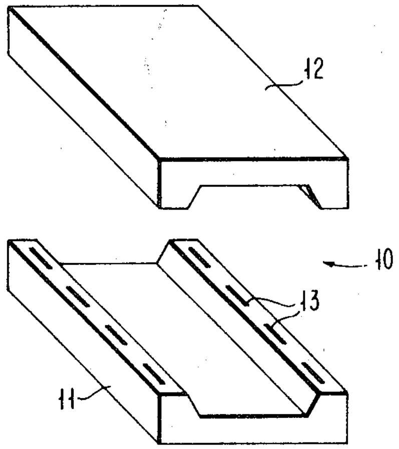
FIG. 1 is an isometric view of the prior art depicting a magnetic head assembly with the mating surfaces separated by shims.

Referring now to the figures of the drawing, there is shown in FIG. 1, a perspective view of a typical magnetic head generally illustrated by the numeral 10 which illustrates a known method for spacing one ferrite section 11 from a second ferrite section 12. As illustrated, the mating surfaces of the ferrite sections 11 and 12 are polished and coated with silicon monoxide shims 13 by evaporation, thereby to define the length of the recording head gap. This gap is then filled with glass (not shown) by a capillary soaking process. Thereafter, a module formed by the assembly of the ferrite sections may be sliced into many recording head elements.

Figure 2:
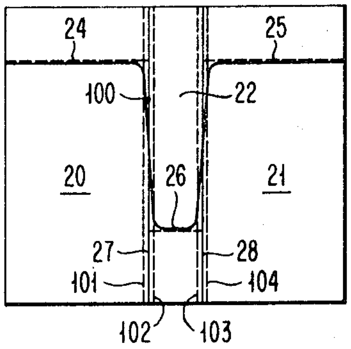
PRIOR ART FIG. 2
FIG. 2 is a side elevation view of the assembled magnetic head of this invention rotated 90° with a superimposed graph showing the composition of the magnetic ferrite and nonmagnetic bond.

In FIG. 2 a preferred embodiment of a magnetic head assembly constructed in accordance with our invention is illustrated. As illustrated a pair of magnetic ferrites 20 and 21 having respective flat and polished mating surfaces 27 and 28 are bonded by a nonmagnetic crystalline ceramic 22 disposed between and abutting the mating surfaces. The nonmagnetic crystalline layer is deposited in a continuous layer onto one of the polished mating surfaces 27. This deposition may be by RF sputtering techniques that are presently known in the art. The deposition of the continuous layer replaces the shims 13 (illustrated in FIG. 1) which were formerly required in manufacturing of magnetic heads. The deposition is continued until the particularly desired length is achieved. The magnetic head assembly of this invention may be advantageously used for producing a nonmagnetic gap that has a relatively thin layer, preferably in the range of 30 to 100 microinches, more preferably in the range of 30 to 200 microinches in thickness. The amount of deposition may be directly monitored by an appropriate measuring instrument during the process. The mating polished surface 28 of the other magnetic ferrite section 21 is then abutted against the nonmagnetic ceramic 22, thereby to create a sandwich. In accordance with this invention, pressure and temperature are then appropriately applied to yield a solid-state diffusion bond between the sandwiched layers 20, 21 and 22. Only enough pressure to make a good contact is required for flat polished surfaces. Temperatures ranging from 950° to 1,200° C. (as a preferred range) may be used and, as in all solid-state diffusion processes there is a temperature-time tradeoff whereby at lower temperatures a longer time is required to achieve the diffusion bond. It is to be noted that the gap length of the sandwich is greater than the deposition length due to the diffusion interface created at the material boundaries.

Any suitable nonmagnetic ferrite, which has a Curie temperature (Tc) below ambient temperature, or ceramic, which has no Curie temperature, may be used as the bonding material of this invention if it is compatible with the magnetic ferrite substrate. The Curie point is the temperature at which there is a transition between the ferrimagnetic and the paramagnetic phases of substances such that the substance is ferrimagnetic below the Curie temperature and para magnetic above the Curie temperature.

The nonmagnetic ferrite material may particularly contain an element from the group comprising manganese, cobalt, nickel and magnesium and also may contain either zinc (Zn) or cadmium (Cd). A preferred embodiment of a nonmagnetic ferrite which has been found useful in the practice of this invention is a nickel-zinc ferrite having a Curie temperature below the ambient working temperature of 21° C., and believed to be below 0° C., and having the chemical formula $Ni_{1-\Delta}Zn_{\Delta}Fe_2O_4$, wherein Δ is greater than or equal to 0.75 and less than or equal to 1.0. As long as Δ is within the described range, the nickel-zinc ferrite exhibits nonmagnetic properties. Furthermore, when Δ is equal to 0.9, a temperature above 950° C. may be successfully used for forming the diffusion bond with a magnetic ferrite of the same general nickel-zinc composition and having Δ=0.65 and a Curie temperature of approximately 120° C. In accordance with the teachings of this invention, a nickel-zinc ferrite having a Δ such that O less than or equal to Δ less than or equal to 0.75 exhibits magnetic properties.

The use of a magnetic and a nonmagnetic ferrite having the same general composition is particularly adapted for use in forming a magnetic head assembly since both materials have substantially the same coefficients of expansion and the constituents of the ferrites have substantially the same diffusion coefficients, thereby to create equal bonds across each interface in the three-layered sandwich. However, any of the above-listed magnetic ferrites may be bonded to any of the described nonmagnetic ferrites or nonmagnetic ceramics in accordance with this invention.

Before diffusion as illustrated by the dashed lines in FIG. 2, when the three materials are sandwiched together, each material contains a constant composition as shown by the ordinate on the superimposed graph. The magnetic ferrite has a constant composition illustrated as 24 and 25 respectively across its length and the nonmagnetic ferrite has a constant composition illustrated by the line 26. The compositions 24, 25 and 26 are discontinuous at the interfaces or boundaries 27 and 28 between adjacent materials. Upon heating, the diffusion process commences and counterdiffusion occurs across each interface. After diffusion is complete, the composition approaches that illustrated by the continuous curve 100. This shows a slight interface between the materials 20 and 22 as illustrated by the distance between the lines 101 and 102 and a like interface between the materials 22 and 21 shown by the distance between the lines 103 and 104. The interfaces are very small and may be 30 microinches for any temperature. The depth of the diffusion depends upon the time and temperature of the heating process and the gap so formed is greater than the length of the nonmagnetic ferrite deposition. The strength of this diffusion bond is much greater than that formed mechanically since there is a continuous molecular structure across each boundary and there is no distinct plane interface.

Figure 3:
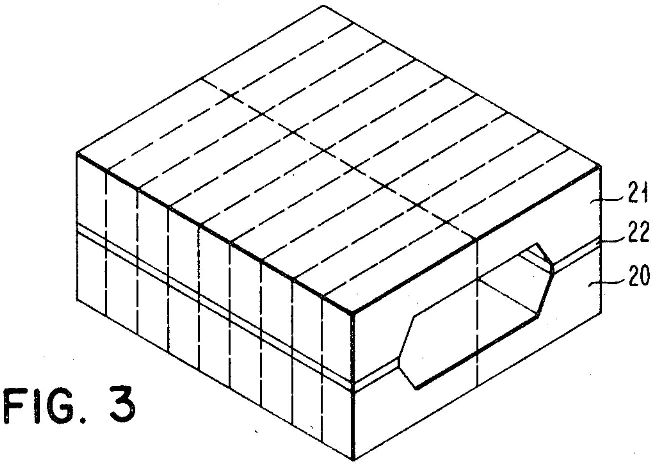
FIG. 3 shows the magnetic head elements cut out of the structure formed in accordance with this invention.

A module formed in accordance with this invention is illustrated in FIG. 3. As shown, the module comprises two magnetic ferrites having a nonmagnetic ferrite disposed between its mating surfaces. This module is sliced into individual recording heads. A winding (not shown) can then be disposed on one of the circuit core parts and assembled into the desired apparatus.

It is understood that the magnetic properties of ferrites vary in accordance with their Curie temperature. The same material may be paramagnetic when used at temperatures above its Curie temperature and it may exhibit ferromagnetic properties at temperatures less than its Curie temperature. It is also understood that the term nonmagnetic ferrite is interpreted broadly so as to include any ceramic material which will satisfy the criteria of a specific application of the invention.

While the invention has been particularly shown and described with reference to the preferred embodiments thereof, it will also be understood by those skilled in the art that various changes in form and details may be made therein without departing from the spirit and scope of the invention.

What is claimed is:

1. A magnetic head assembly comprising:

a pair of magnetic ferrites having mating surfaces; and a transducing gap comprising a continuous nonmagnetic crystalline ferrite diffusion bonded between said mating surfaces.

2. The magnetic head assembly set forth in claim 1 wherein said nonmagnetic ferrite has substantially the same hardness as said magnetic ferrite.

3. The magnetic head assembly set forth in claim 1 wherein said nonmagnetic ferrite has a thickness of approximately 30 microinches.

4. The magnetic head assembly set forth in claim 1 wherein said ferrites comprises a nickel-zinc ferrite composition.

5. The magnetic head assembly set forth in claim 4 wherein said nonmagnetic nickel-zinc ferrite has a chemical composition set forth by the equation $Ni_{1-\Delta}Zn_{\Delta}Fe_2O_4$ and wherein $0.75 \leq \Delta \leq 1.0$.

6. The magnetic head assembly set forth in claim 5 wherein Δ=0.9.

7. The magnetic head assembly set forth in claim 4 wherein said nonmagnetic nickel-zinc ferrite has a Curie temperature below 21° C.

10. The magnetic head assembly set forth in claim 1 wherein said diffusion bonding is solid-state and occurs when the magnetic head assembly is heated to a temperature of at least 950° C.

9. The magnetic head assembly set forth in claim 1 wherein the constituents of said magnetic and said nonmagnetic ferrites have substantially the same diffusion coefficients.

10. The magnetic head assembly set forth in claim 1 wherein said nonmagnetic ferrite contains an element from the following group: manganese, cobalt, nickel and magnesium.

11. The magnetic head assembly set forth in claim 1 wherein said nonmagnetic ferrite contains an element from the following group: zinc and cadmium.

12. A magnetic head assembly comprising:

a pair of magnetic ferrites having mating surfaces; and a transducing gap comprising a nonmagnetic ferrite that is solid-state diffusion bonded between said mating surfaces;

said ferrites having a nickel-zinc composition and wherein said nonmagnetic nickel-zinc ferrite has a chemical composition set forth by the equation $Ni_{1-\Delta}Zn_{\Delta}Fe_2O_4$ and wherein $0.75 \leq \Delta \leq 1.0$.

* * * * *